(12) United States Patent
Reddy et al.

(10) Patent No.: US 7,879,305 B2
(45) Date of Patent: Feb. 1, 2011

(54) APPARATUS AND METHOD FOR SEQUESTERING FLUE GAS $CO_2$

(75) Inventors: Katta J. Reddy, Laramie, WY (US); Morris D. Argyle, Laramie, WY (US)

(73) Assignee: University of Wyoming, Laramie, WY (US)

( * ) Notice: Subject to any disclaimer, the term of this patent is extended or adjusted under 35 U.S.C. 154(b) by 0 days.

(21) Appl. No.: 12/215,638

(22) Filed: Jun. 27, 2008

(65) Prior Publication Data

US 2008/0267838 A1 Oct. 30, 2008

Related U.S. Application Data

(63) Continuation of application No. PCT/US2006/049411, filed on Dec. 28, 2006.

(60) Provisional application No. 60/755,959, filed on Jan. 3, 2006.

(51) Int. Cl.
*C01F 11/18* (2006.01)

(52) U.S. Cl. .................. 423/432; 423/210; 423/220; 423/230; 423/232; 423/233; 423/235; 423/419.1; 423/437.1

(58) Field of Classification Search ............... 422/139; 423/220, 230, 232, 233, 432, 437.1, 419.1, 423/430

See application file for complete search history.

(56) References Cited

U.S. PATENT DOCUMENTS

| | | | |
|---|---|---|---|
| 2,947,656 A | 8/1960 | Bailey | |
| 3,495,941 A | 2/1970 | Van Helden | |
| 3,578,390 A | 5/1971 | Kruel | |
| 3,932,587 A | 1/1976 | Granthan et al. | |
| 4,101,172 A | 7/1978 | Rabbitts | |
| 4,228,139 A * | 10/1980 | Johnson | 423/243.1 |

(Continued)

FOREIGN PATENT DOCUMENTS

WO WO0185307 * 11/2001

OTHER PUBLICATIONS

Montes-Hernandez, G., et al., "Mineral sequestration of CO2 by aqueous carbonation of coal combustion fly-ash", Journal of Hazardous Materials, Apr. 24, 2008, pp. 8, Elsevier.

(Continued)

*Primary Examiner*—Walter D Griffin
*Assistant Examiner*—Huy-Tram Nguyen
(74) *Attorney, Agent, or Firm*—Scott J. Hawranek; Hogan Lovells US LLP

(57) ABSTRACT

A fluidized bed reactor device for sequestering flue gas $CO_2$ from a flue gas source is provided. The fluidized bed reactor device comprises an operating portion having a first end and a second end. A flue gas inlet is formed at the first end of the operating portion with the flue gas inlet receiving flue gas from the flue gas source. A flue gas outlet formed at the second end of the operating portion. A distributor plate is mounted within the operating portion adjacent the first end of the operating portion. A volume of fly ash is encased within the operating portion between the second end and the distributor plate with the flue gas traveling through the distributor plate and the fly ash creating reacted flue gas wherein the reacted flue gas exits the operating portion through the flue gas outlet.

18 Claims, 1 Drawing Sheet

U.S. PATENT DOCUMENTS

| | | | |
|---|---|---|---|
| 4,244,709 A | | 1/1981 | Chang |
| 4,412,914 A | | 11/1983 | Hettinger, Jr. et al. |
| 4,495,163 A | * | 1/1985 | Nguyen ................ 423/243.08 |
| 4,969,930 A | | 11/1990 | Arpalahti |
| 5,100,633 A | * | 3/1992 | Morrison ..................... 423/225 |
| 5,275,230 A | | 1/1994 | Balling et al. |
| 5,502,021 A | * | 3/1996 | Schuster ..................... 502/400 |
| 5,817,282 A | | 10/1998 | Radlein et al. |
| 6,001,152 A | | 12/1999 | Sinha |
| 6,843,831 B2 | * | 1/2005 | van de Kleut et al. ......... 95/134 |
| 2001/0042716 A1 | | 11/2001 | Iversen et al. |
| 2001/0054253 A1 | * | 12/2001 | Takahashi et al. .............. 47/63 |
| 2004/0200393 A1 | * | 10/2004 | Zauderer .................... 110/345 |
| 2004/0213705 A1 | * | 10/2004 | Blencoe et al. ............. 422/129 |
| 2004/0228788 A1 | * | 11/2004 | Nagai et al. ................. 423/432 |
| 2004/0266933 A1 | * | 12/2004 | Friedman et al. ............ 524/442 |
| 2005/0002847 A1 | * | 1/2005 | Maroto-Valer et al. ...... 423/432 |
| 2005/0036932 A1 | * | 2/2005 | Takahashi et al. ........... 423/432 |
| 2005/0238563 A1 | * | 10/2005 | Eighmy et al. .............. 423/432 |
| 2006/0185560 A1 | * | 8/2006 | Ramme et al. .............. 106/672 |
| 2007/0168213 A1 | | 7/2007 | Comrie |
| 2008/0267838 A1 | | 10/2008 | Reddy et al. |
| 2009/0169452 A1 | | 7/2009 | Constantz et al. |
| 2010/0221163 A1 | | 9/2010 | DaCosta et al. |

OTHER PUBLICATIONS

Perez-Lopez, R., et al. "Carbonation of alkaline paper mill waste to reduce CO2 greenhouse gas emissions into the atmosphere", Applied Geochemistry 23 (2008) 2292-2300, Elsevier. .

"The Solid-Solution Interface", No Date, pp. 516-594.

Adariano, D.C., et al., "Utilization and Disposal of Fly Ash and Other Coal Residues in Terrestrial Ecosystems: A Review", Journal of Environmental Quality, Reviews and Analyses, vol. 9, Jul.-Sep. 1980, No. 3, 333-344.

Pichtel, J.R., "Microbial Respiration in Fly Ash/Sewage Sludge-Amended Soils", Environmental Pollution 63 (1990) 225-237, Elsevier Science Publishers Ltd, England.

"Summary of the Second Conference on Unburned Carbonaceous Material on Utility Fly Ash", Mar. 1996, The Third Conference on Unburned Carbon on Utility Fly Ash, pp. i, 1-83.

Herzog, Howard, "An Introduction to CO2 Separation and Capture Technologies", MIT Energy Laboratory, Aug. 1999.pp. 1-8.

Reynolds, Steven P., et al., "New Pressure Swing Adsorption Cycles for Carbon Dioxide Sequestration", Adsorption 11: 531-536, 2005, Springer Science + Business Media, Inc., The Netherlands.

Kintisch, Eli, "Making Dirty Coal Plants Cleaner", Science, vol. 317, Jul. 13, 2007, pp. 184-186.

Lackner, Klaus S., "A Guide to CO2 Sequestration", Science, vol. 300, Jun. 13, 2003, pp. 1677-1678, 1.

Reddy, K.J., et al., "Solubility Relationships and Mineral Transformations Associated with Recarbonation of Retorted Shales", J. Environ. Qual., vol. 15, No. 2, 1986, pp. 129-133.

Reddy, K. J., et al., "Availability and Plant Uptake of Trace Elements from Recarbonated Retorted Shale", J. Environ. Qual., vol. 16, No. 2, 1987, pp. 168-171.

Reddy, K.J., et al., "Effects of a carbon dioxide pressure process on the solubilities of major and trace elements in oil shale solid wastes", Environ. Sci. Technol., 1991, 25 (8), 1466-1469, American Chemical Society, Washington, D.C.

Reddy, K.J., et al., "Reaction of CO2 with Alkaline Solid Wastes to Reduce Contaminant Mobility", Pergamon, Wat. Res. vol. 28, No. 6, pp. 1377-1382, 1994, Elsevier Science Ltd.

Tawfic, T.A., et al., "Reaction of CO2 with Clean Coal Technology Ash to Reduce Trace Element Mobility", Water, Air and Soil Pollution 84: 385-398, 1995, Kluwer Academic Publishers, The Netherlands.

Reddy, K.J., et al., "Development of a Carbon Dioxide Pressure Technique for Chemical Stabilization of Alkaline Clean Coal Technology (CCT) Ash", Electric Power Research Institute, Wyoming Water Resources Center/ University of Wyoming, Laramie, WY, Jun. 1995, pp. i-x, 1-36.

Reddy, K.J., "Application of Carbon Dioxide in Remediation of Contaminants: A New Approach", University of Wyoming, Laramie, WY, No Date, pp. 829-838.

Meima, Jeannet A., et al., "Carbonation processes in municipal solid waste incinerator bottom ash and their effect on the leaching of copper and molybdenum", Applied Geochemistry 17 (2002) 1503-1513, Pergamon.

Ecke, Holger, et al., "Carbonation of Municipal Solid Waste Incineration Fly Ash and the Impact on Metal Mobility", Journal of Environmental Engineering© ASCE, May 2003, pp. 435-440.

Kim, Sang-Yul, et al., "Evaluation of pre-treatment methods for landfill disposal of residues from municipal solid waste incineration", Waste Management & Research, 2003, 416-425.

Ahn, Ji-Whan, et al., "Characteristic of Carbonation Reaction from Municipal Solid Waste Incinerator Bottom Ash as a Function of Water Content and Their Effect on the Stabilization of Copper and Lead", Materials Science Forum vols. 544-545 (2007), pp. 533-536, Trans Tech Publications, Switzerland.

Bertos, Fernandez M., et al., "A review of accelerated carbonation technology in the treatment of cement-based materials and sequestration of CO2", Journal of Hazardous Materials B112 (2004), 193-205, Elsevier.

Huijgen, Wouter, J. J., et al.,"Carbonation of Steel Slag for CO2 Sequestration: Leaching of Products and Reaction Mechanisms", Environ. Sci. Technol. 2006, vol. 40, No. 8, 2790-2796.

Baciocchi, Renato, et al., "CO2 Sequestration by Direct Gas-Solid Carbonation of Air Pollution Control (APC) Residues", Energy Fuels, 2006, American Chemical Society, 20(5), pp. 10.

Huijgen, Wouter, J. J., et al., "Mechanisms of aqueous wollastonite carbonation as a possible CO2 sequestration process", Chemical Engineering Science 61 (2006) 4242-4251, Elsevier.

Gerdemann, Stephen J., et al., "Ex Situ Aqueous Mineral Carbonation", Environ. Sci. Technol. 2007, vol. 41, No. 7, 2587-2593.

Costa, Giulia, et al., "Current status and perspectives of accelerated carbonation processes on municipal waste combustion residues," Environ Monit Assess (2007), 135:55-75, Springer.

Theis, Thomas L., et al. "Sorptive behavior of trace metals on fly ash in aqueous systems", Environ. Sci. Technol., 1977, 11 (12), 1096-1100, American Chemical Society, Washington DC.

Essington, M.E., "Trace Element Mineral Transformations Associated with Hydration and Recarbonation of Retorted Oil Shale", Environ. Geol Water Sci. vol. 13, No. 1, 1989, 59-66, Springer-Verlag New York Inc.

Atimtay, Aysel T., "Cleaner energy production with integrated gasification combined cycle systems and use of metal oxide sorbents for H2S cleanup from coal gas", Clean Products and Processes 2 (2001), 197-208, Springer-Verlag New York Inc.

2007 Coal Combustion Product (CCP) Production & Use Survey Results (Revised), ACAA, Sep. 15, 2008, p. 1.

Huijgen, Wouter, J. J., et al., "Mineral CO Sequestration by Steel Slag Carbonation", Environmental Science & Technology, 2005, 39 (24) 9676-9682, American Chemical Society, Washington, D.C.

Zhang, Hua, et al., "Temporary stabilization of air pollution control residues using carbonation", Waste Management 28 (2008), 509-517, Elsevier Ltd.

Piwoni, Marvin D. and Keeley, Jack W., "Basic Concepts of Contaminant Sorption at Hazardous Waste Sites", Ground Water Issue, Superfund Technology Support Center for Ground Water, p. 1-7, Robert S. Kerr Environmental Research Laboratory, Ada, OK, Jan. 1989.

McLean, Joan E. and Bledsoe, Bert E., "Behavior of Metals in Soils," Ground Water Issue, Superfund Technology Support Center for Ground Water, p. 1-25, Robert S. Kerr Environmental Research Laboratory, Ada, OK.

Palumbo, Anthony V., et al., "Fly Ash Characteristics and Carbon Sequestration Potential", World of Coal Ash, May 7-10, 2007, Covington, KY.

Palumbo, A.V., et al. "Issues with the Use of Fly Ash for Carbon Sequestration".

Montague, Peter, "Carbon sequestration and the precautionary principle", Gristmill, http://gristmill.grist.org/stroy/2007/11/10/151448/65, posted Nov. 12, 2007, as printed Dec. 3, 2008.

Plasynski, Sean, et al., "Project Facts: Carbon Dioxide Capture by Absorption with Potassium Carbonate", Apr. 2008, U.S. Department of Energy, Office of Fossil Energy, National Energy Technology Laboratory.

White, Curt M. and Diane Newlon, "R&D Facts: Carbon Sequestration Science", Jun. 2002, U.S. Department of Energy, Office of Fossil Energy, National Energy Technology Laboratory.

Written Opinion in PCT/US2006/049411 mailed Oct. 2, 2007.

"Perry's Chemical Engineers' Handbook", 7th ed., Robert H. Perry, Don w. Green and James O. Maloney, Editors, 1997, 17-1-17-19, McGraw-Hill.

Notification of Transmittal of the International Search Report and the Written Opinion of the International Searching Authority, or the Declaration, PCT/US2009/42379, mailed Aug. 20, 2009, pp. 3.

Written Opinion of the International Searching Authority, PCT/US2009/42379, mailed Aug. 20, 2009, pp. 5.

Biello, David, "Cement from CO2: A Concrete Cure for Global Warming?", Scientific American, http://www.calera.com/pdf/scientific_american%20copy.pdf, Aug. 7, 2008, pp. 2.

American Coal Ash Association 2007 Production and Use Survey. http://www.acaa-usa.org/displaycommon.cfm?an=1&subarticlenbr=3, Nov. 5 2008, 1 page.

Stumm, et al. "Aquatic Chemistry: Chemical Equilibria and Rates in Natural Waters, " 3rd Edition, John Wiley & Sons, New York, 1996, Third Edition, Chapter 9, The Solid-Solution Interface, pp. 517-594.

Reddy, et al., "Development of a Carbon Dioxide Pressure Technique for Chemical Stabilization of Alkaline Clean Coal Technology (CCT) Ash", Electric Power Research Institute (EPRI), Palo Alto, CA, 1995, TR-104840, pp. 1-36.

Tyson, "Proceeding of the Third Annual Conference on Unburned Carbon on Utility Fly Ash," US Department of Energy, FETC, May 1997, Unintended Effects of NOx Emission Control Strategies on Unburned Carbon and CCP Marketability, pp. 3-5.

* cited by examiner

APPARATUS AND METHOD FOR SEQUESTERING FLUE GAS $CO_2$

The present application is a continuation of International Application PCT/US2006/049411, with an international filing date of Dec. 28, 2006, which claims benefit of priority of provisional patent application Ser. No. 60/755,959, filed on Jan. 3, 2006, entitled "Method for Sequestering Flue Gas $CO_2$".

BACKGROUND OF THE INVENTION

1. Field of the Invention

This invention relates generally to an apparatus and method for sequestering flue gas $CO_2$ and, more particularly, the invention relates to an apparatus and method for sequestering flue gas $CO_2$ having a fluidized bed reactor for simultaneously capturing and mineralizing coal combustion flue gas $CO_2$.

2. Description of the Prior Art

Atmospheric $CO_2$ (g) is indispensable for physical, chemical, and biological processes which occur in the atmosphere, hydrosphere, and geosphere of the planet Earth. During the past 150 years, atmospheric $CO_2$ concentration increased approximately 30 percent, due to burning of fossil fuels containing carbon. For example, before industrial rapid growth, the atmospheric $CO_2$ concentration was 280 ppm and the current $CO_2$ concentration is 381 ppm. Increase in atmospheric $CO_2$ concentration is typically attributed to the global warming and subsequent climate change problems.

Coal reserves are vital for providing global primary energy needs. Studies suggest that energy production from coal combustion process is also recognized for more than 50% of the increase in global $CO_2$ levels in the atmosphere. Energy production from coal combustion power plants, like any other industrial process, results in various by-products, including flue gases (e.g., $CO_2$, SOx, NOx) and solid wastes (e.g., fly ash and bottom ash). The new Clean Air Act enacted by the U.S. Congress mandated the reduction of SOx emissions from coal burning power plants. As a result, varieties of Clean Coal Technologies (CCTs) are developed and implemented. Applications of CCTs result in production of alkaline CCT ash with pH ranging from 9-12. In addition, there has been much discussion recently on proposals to reduce atmospheric $CO_2$ emissions, possibly by enacting carbon taxes.

Currently several techniques exist to capture $CO_2$ from coal combustion processes:
  Pre-combustion methods (fuel decarbonization);
  Combustion in $O_2/CO_2$ atmospheres (oxy-fuel firing); and
  Post-combustion capture methods.

However, all of the above techniques have their own drawbacks. For example, these techniques are energy extensive and produce additional by-products which require special handling and disposal methods.

Several journal articles on the $CO_2$ (g) infusion technique (carbonation process) for alkaline solid wastes have been published. These carbonation studies were conducted in an attempt to speed up the natural carbonation process as well help protect the environment (air, surface water, soil, and groundwater). The studies suggested that since the carbonation process uses $CO_2$, which can be obtained from the coal combustion process itself. Another potential benefit is that the carbonation process could help capture and minimize $CO_2$ emissions into the atmosphere. However, previous batch laboratory experiments have experienced diffusion limitations—that is, the $CO_2$ may not efficiently contact the ash sample. In addition, nothing exists to simultaneously capture and mineralize coal combustion flue gas $CO_2$ with fly ash or bottom ash under actual plant combustion conditions.

Accordingly, there exists a need for an in-plant use to capture and mineralize flue gas $CO_2$ for both reducing flue gas $CO_2$ emissions and stabilizing ash.

SUMMARY

The present invention is a fluidized bed reactor device for sequestering flue gas $CO_2$ from a flue gas source. The fluidized bed reactor device comprises an operating portion having a first end and a second end. A flue gas inlet is formed at the first end of the operating portion with the flue gas inlet receiving flue gas from the flue gas source. A flue gas outlet formed at the second end of the operating portion. A distributor plate is mounted within the operating portion adjacent the first end of the operating portion. A volume of fly ash is encased within the operating portion between the second end and the distributor plate with the flue gas traveling through the distributor plate and the fly ash creating reacted flue gas wherein the reacted flue gas exits the operating portion through the flue gas outlet.

In addition, the present invention includes a method for sequestering flue gas $CO_2$ from a flue gas source for simultaneously capturing and mineralizing coal combustion flue gas $CO_2$. The method comprises providing an operating portion having a first end and a second end, forming a flue gas inlet at the first end of the operating portion, forming a flue gas outlet at the second end of the operating portion, mounting a distributor plate within the operating portion adjacent the first end of the operating portion, encasing a volume of fly ash within the operating portion between the second end and the distributor plate, introducing flue gas from the flue gas source into the operating portion through the flue gas inlet, forcing the flue gas through the distributor plate, forcing the flue gas through the volume of fly ash creating reacted flue gas, separating the fly ash from the reacted flue gas, and removing the reacted flue gas from the operating portion through the flue gas outlet.

The present invention further includes a fluidized bed reactor device for sequestering flue gas $CO_2$ from a flue gas source. The fluidized bed reactor device comprises an operating portion having a first end and a second end. A flue gas inlet is formed at the first end of the operating portion, the flue gas inlet receiving flue gas from the flue gas source. A flue gas outlet is formed at the second end of the operating portion. A distributor plate is mounted within the operating portion adjacent the first end of the operating portion. A volume of fly ash is encased within the operating portion between the second end and the distributor plate with the flue gas traveling through the distributor plate and the fly ash creating reacted flue gas. Pressurizing means between the operating portion and the flue gas source force the flue gas from the flue gas source through the operating portion from the first end to the second end. Filtering means mounted over the flue gas outlet filters reacted flue gas from fly ash with the reacted flue gas exiting the operating portion through the flue gas outlet wherein the reacted flue gas exits the operating portion through the flue gas outlet and wherein the fluidized bed reactor simultaneously captures and mineralizes coal combustion flue gas $CO_2$.

DETAILED DESCRIPTION OF THE PREFERRED EMBODIMENTS

Figure 1:
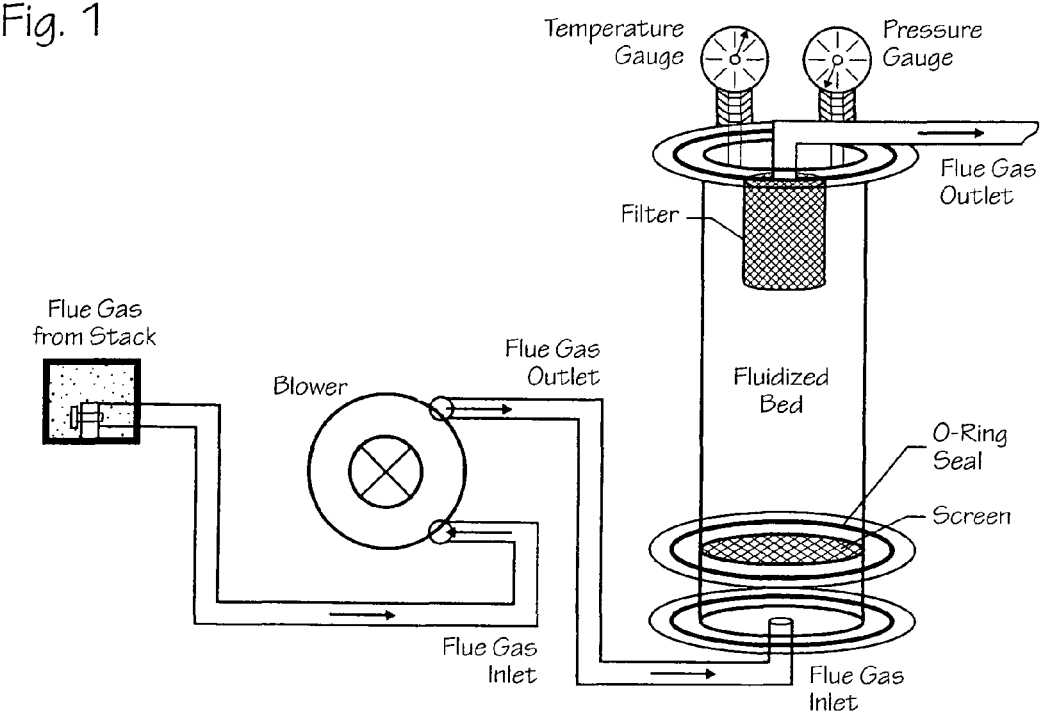
FIG. 1 is a schematic view illustrating a fluidized bed reactor for simultaneously capturing and mineralizing coal combustion flue gas $CO_2$, constructed in accordance with the present invention.

As illustrated in FIG. 1, the present invention is an apparatus and method for sequestering flue gas $CO_2$, indicated generally at 10, which simultaneously captures and mineralizes coal combustion flue gas $CO_2$ from a flue gas source such as a power plant stack. The apparatus 10 of the present invention includes a fluidized bed reactor 12 designed and fabricated to simultaneously capture and mineralize coal combustion flue gas $CO_2$. The fluidized bed reactor 12 is preferably constructed from a Plexiglas material allowing the fluidized bed operation to be observed. While the fluidized bed reactor 12 has been described and illustrated herein as being constructed from a Plexiglas material, it is within the scope of the present invention to construct the fluidized bed reactor 12 from other materials.

Since flue gas from a power plant stack is available at approximately atmospheric pressure and does not provide sufficient pressure to operate the fluidized bed reactor 12, the apparatus 10 of the present invention includes a blower 14 (preferably approximately sixty (60) standard cubic feet per minute) forcing the flue gas through the fluidized bed reactor 12. The blower 14 includes a flue gas inlet 16 for receiving flue gas from the flue gas source and flue gas outlet 18 for directing the pressurized flue gas to the fluidized bed reactor 12.

The fluidized bed reactor 12 of the apparatus 10 of the present invention has an operating portion 20 having a first end 22 and a second end 24. The operating portion 20 is preferably cylindrical having an approximately one (1') foot diameter and an approximately four (4') feet long length although having an operating portion 20 with a different shape, diameter/width, and/or length is within the scope of the present invention. A flue gas inlet 26 is positioned near the first end 22 of the operating portion 20 of the fluidized bed reactor 12 for receiving the pressurized flue gas from the blower 14.

The operating portion 20 of the fluidized bed reactor 12 further contains a volume of fly ash encased therein. Preferably, the volume of fly ash has a depth of approximately two (2') feet. A distributor plate or screen 30 is mounted within the operating portion 20 directly below the volume of fly ash. The distributor plate 20 preferably includes three hundred and seven (307) one-eighth (⅛") inch diameter holes providing uniform distribution of the pressurized flue gas through the volume fly ash directly above the distributor plate 20. It should be noted that the number and size of the holes in the distributor plate 20 can be varied depending on the desired distribution of the flue gas.

A pleated fabric filter 32 is secured to the first end 22 of the operating portion 20 of the fluidized bed reactor 12. The filter 32 separates the reacted flue gas and returns the fly ash to the volume of fly ash for additional contact with fresh flue gas from the power plant stack. The reacted gas exits the operating portion 20 of the fluidized bed reactor 12 through the flue gas outlet 28.

The fluidized bed reactor 12 of the apparatus 10 of the present invention further includes a temperature gauge 34 for measuring the temperature within the operating portion 20 and a pressure gauge 36 for measuring the pressure within the operating portion 20. The temperature gauge 34 and the pressure gauge 36 allow constant monitoring of the fluidized bed reactor 12 during operation.

Testing

The fluidized bed reactor has been tested at a typical coal combustion power plant in Wyoming. In this field test, approximately one hundred (100 lbs.) of power plant fly ash were reacted with their respective flue gases for fifteen (15) minutes. Reacted and unreacted fly ash samples were carefully transported to the Department of Renewable Resources. University of Wyoming, for subsequent testing for inorganic carbon content.

Figure 2:
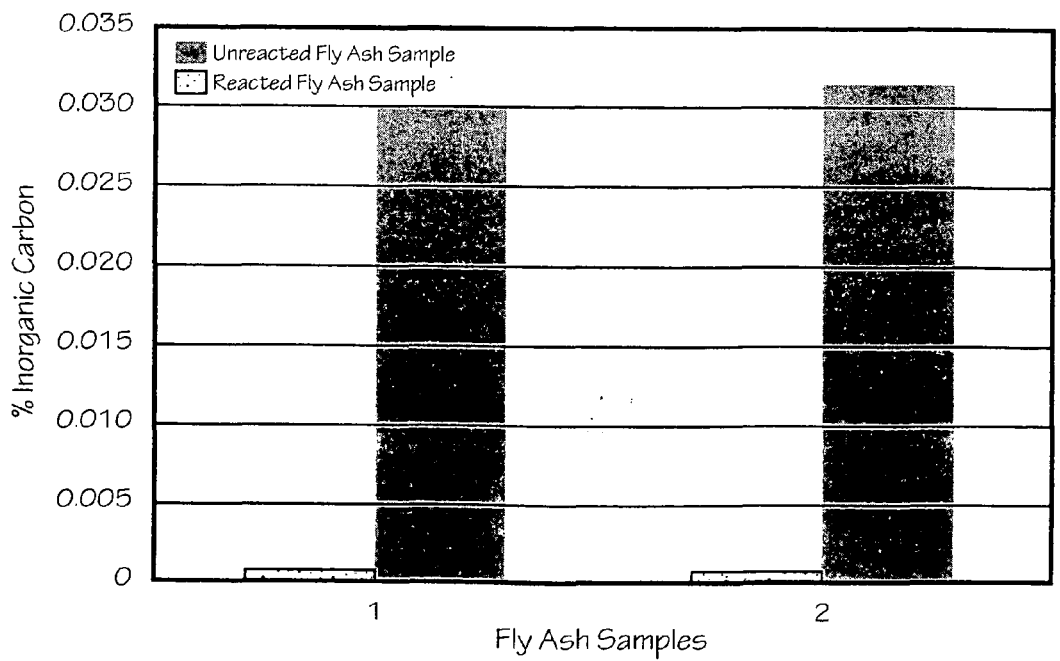
FIG. 2 is a graph illustrating the effect of coal combustion flue gas on inorganic carbon content of fly ash samples.

Results from field testing are illustrated in FIG. 2. These results show that the inorganic carbon content of the fly ash increased by a factor of approximately thirty (30) times based on a calculation of the approximate flow rate of flue gas, amount of ash in the reactor, and the lab results, thereby suggesting that ash absorbed about four (4%) percent of the $CO_2$ that passed through the reactor.

The apparatus and method of the present invention has many benefits. Several of the benefits are as follows:

Economically capturing flue gas $CO_2$ from coal combustion and other combustion processes (e.g., cement plants, municipal sold waste incinerators, and other solid waste incinerators) and converting these greenhouse emissions into beneficial products.

Minimizing emissions of $CO_2$ and protecting the atmosphere from coal combustion power plants, cement plants, municipal solid waste incinerators, and other solid waste incinerators.

Stabilizing carbonated ash for safe land disposal or sale for other uses, such as immobilizing contaminants at hazardous waste disposal sites, and reclamation of acidic and sodic soils.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A method of sequestering carbon dioxide from an industrial flue gas, comprising the steps of:
    providing the industrial flue gas comprising carbon dioxide to a fluidized bed reactor; and
    mineralizing at least a portion of the carbon dioxide by reacting the carbon dioxide with unprocessed power plant fly ash to form carbonated ash in the fluidized bed reactor at a rate of about 0.05 [grams of $CO_2$/ (min. * kg of flyash)] or greater.

2. The method of claim 1, wherein the industrial flue gas comprises a flue gas from a solid waste incinerator.

3. The method of claim 1, wherein the industrial flue gas comprises a flue gas from a coal combustion source.

4. The method of claim 1, wherein the industrial flue gas comprises a flue gas from a cement plant.

5. The method of claim 1, wherein the unprocessed power plant fly ash comprises bottom ash.

6. The method of claim 1, further comprising the step of stabilizing the carbonated ash.

7. The method of claim 1, further comprising the step of filtering the reacted flue gas with a filter to separate the reacted flue gas and return the fly ash for additional contact with the flue gas.

8. The method of claim 1, wherein the step of providing the industrial flue gas comprises distributing the flue gas in a substantially uniform distribution in the fluidized bed reactor.

9. A method of simultaneously capturing and mineralizing $CO_2$ in flue gas with a fluidized bed reactor, the method comprising the steps of:
   providing the flue gas comprising the $CO_2$ to an inlet of the fluidized bed reactor;
   distributing the flue gas in a substantially uniform distribution in the fluidized bed reactor;
   simultaneously capturing and mineralizing $CO_2$ by reacting the flue gas with unprocessed power plant fly ash, wherein the simultaneously capturing and mineralizing is conducted at a rate of about 0.05 [grams of $CO_2$/(min. * kg of flyash)] or greater;
   filtering the reacted flue gas and the fly ash to separate the reacted flue gas and return the fly ash for additional contact with the flue gas; and
   stabilizing the mineralized $CO_2$.

10. The method of claim 9, wherein the distributing step comprises providing flue gas at about 60 standard cubic feet per minute through a distributor plate.

11. The method of claim 9, further comprising the steps of:
    measuring a temperature within the fluidized bed reactor; and
    measuring the pressure within the fluidized bed reactor.

12. The method of claim 9, wherein the flue gas comprises a flue gas from a solid waste incinerator.

13. The method of claim 9, wherein the flue gas comprises a flue gas from a coal combustion source.

14. The method of claim 9, wherein the flue gas comprises a flue gas from a cement plant.

15. The method of claim 9, wherein the fly ash comprises power plant fly ash.

16. The method of claim 9, wherein the fly ash comprises bottom ash.

17. A method of simultaneously capturing and mineralizing $CO_2$ in flue gas with a fluidized bed reactor, the method comprising the steps of:
    providing the flue gas from a coal fired plant comprising the $CO_2$ to an inlet of the fluidized bed reactor;
    distributing the flue gas in a substantially uniform distribution in the fluidized bed reactor;
    simultaneously capturing and mineralizing $CO_2$ by reacting flue gas with the unprocessed power plant fly ash to capture carbon dioxide at a rate of about 0.05 [grams of $CO_2$/ (min. * kg of flyash)] or greater;
    filtering the reacted flue gas and the fly ash; and
    stabilizing the reacted fly ash comprising mineralized $CO_2$.

18. The method of claim 17, wherein the flue gas comprises a flue gas from a coal combustion source.

* * * * *